Patented May 12, 1942

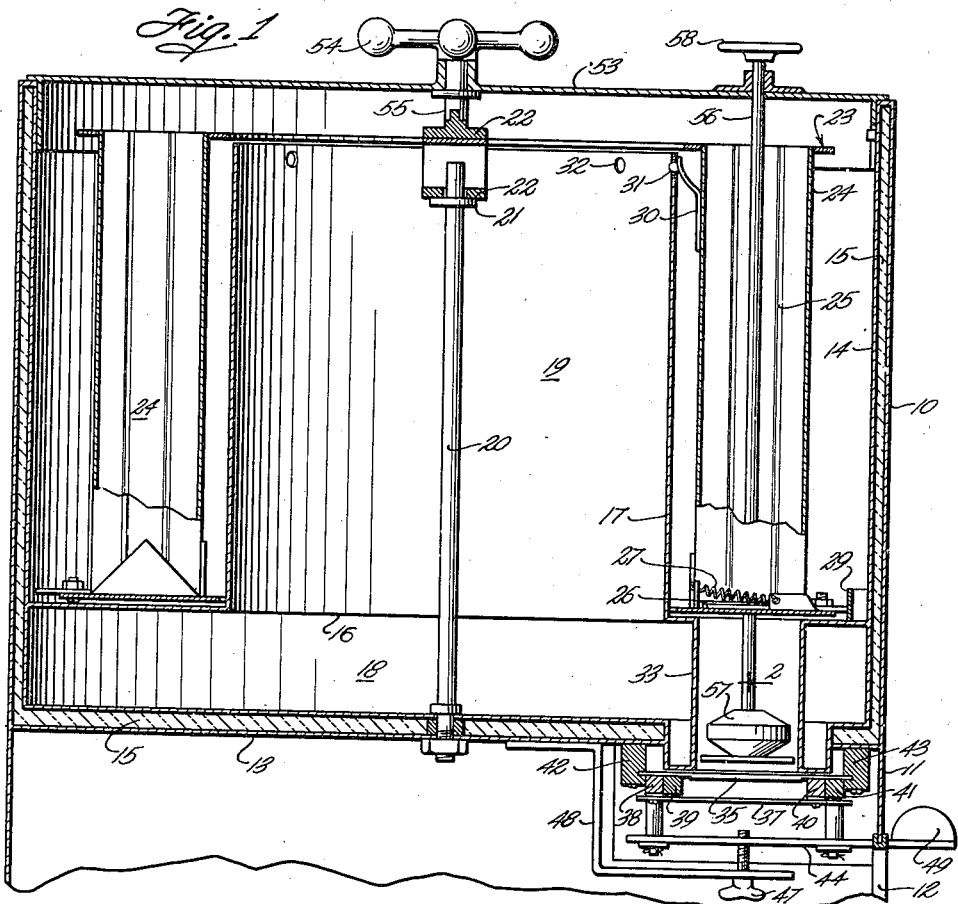
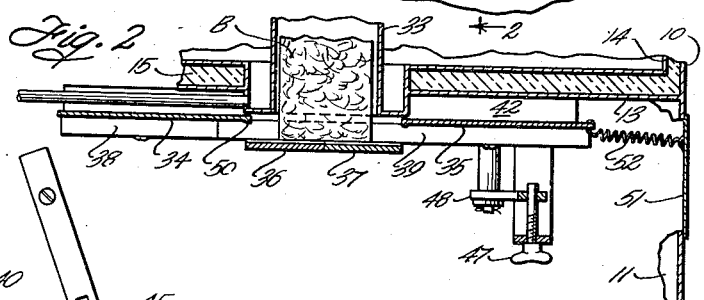
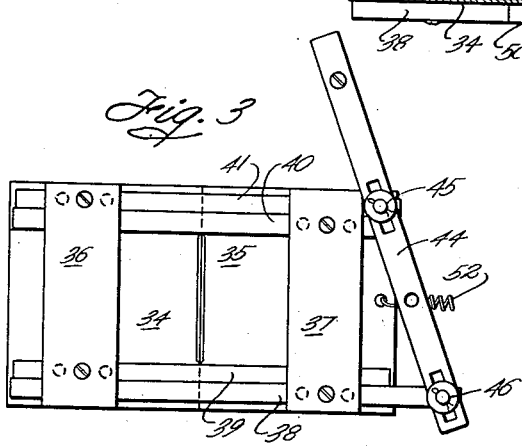

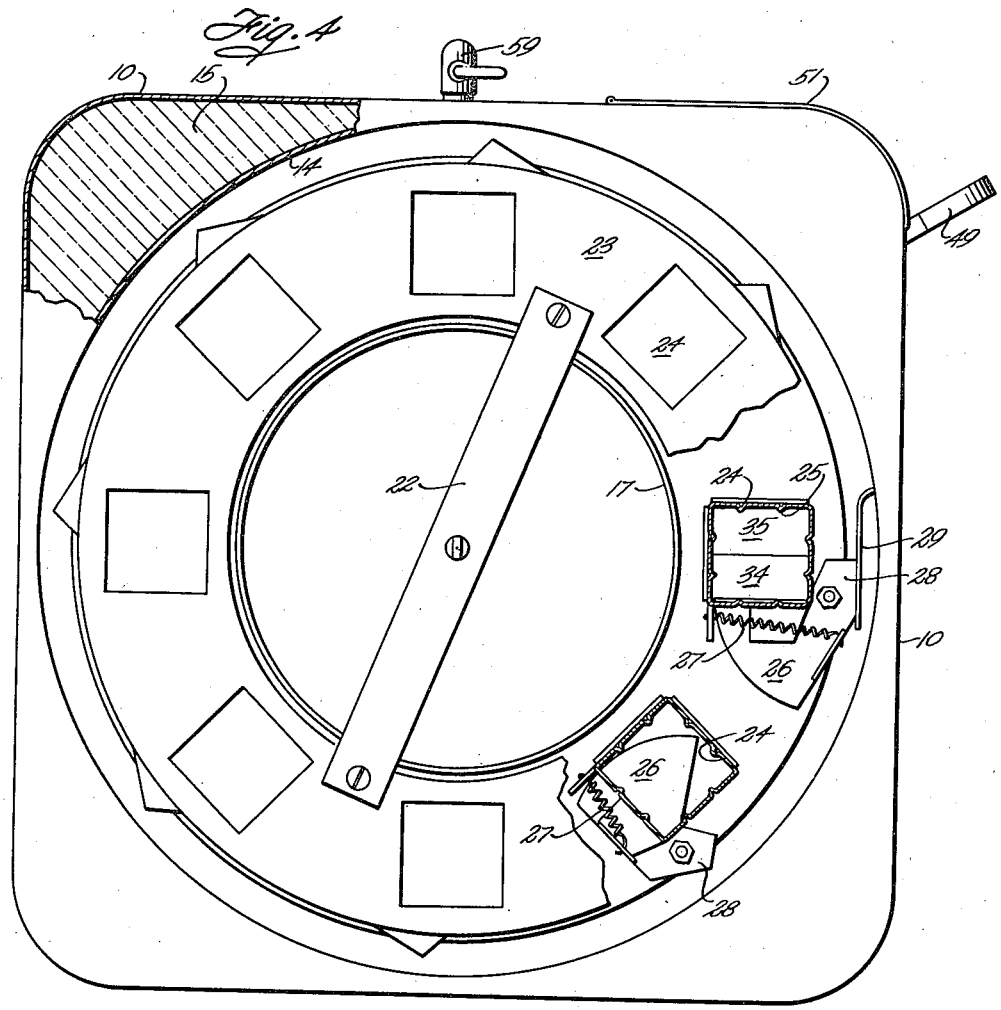

2,282,735

UNITED STATES PATENT OFFICE 2,282,735

BUTTER SLICING AND DISPENSING MACHINE

Wallace M. Merrick, Los Angeles, Calif.

Application August 23, 1940, Serial No. 353,970

9 Claims. (Cl. 31—21)

This invention relates to a butter slicing and dispensing machine. An object of the invention is to provide an improved butter slicing and dispensing machine embodying a magazine adapted to receive butter that is to be sliced into pats or tabs which is so constructed that the cutting or slicing mechanism will quickly and efficiently cut the butter without danger of the butter sticking thereto. In prior devices of this general character butter is fed to a slicing device or mechanism which is usually in the form of a single reciprocable cutting blade or cutting wire. Such single or reciprocable cutting blade or cutting wire on passing through the butter tends to force it laterally and the cut-off slice is very apt to and frequently does stick to any adjacent object with which it may come in contact, resulting in inconvenience in dislodging or separating such slice.

Specifically an object of the present invention is to provide an improved cutting mechanism for butter slicing and dispensing devices which uses two opposed reciprocable blades which are simultaneously moved toward each other through the butter to accomplish the slicing action. In this way the two slicing blades being directly opposed do not have any tendency or effect of forcing the butter toward a side of a chute or passage through which it is fed. Consequently danger of the butter sticking is reduced to a minimum.

Another object of the invention is to provide a cutting mechanism for a butter slicing machine having two reciprocable opposed cutting blades associated with two reciprocable supporting plates, the plates being spaced from the blades a distance equal to the thickness of the pat or tab of butter that is to be sliced and serving to support the butter between slicing operations. These supporting plates are connected respectively to their respective blades and are movable simultaneously therewith so that when the blades are brought together to accomplish slicing the supporting plates separate to permit the cut off pat or tab of butter to drop therefrom.

A further object of the invention is to provide an improved slicing blade for the cutting mechanism of butter slicing and dispensing machines, the blade being so formed as to provide adequate clearance for the body of the blade so that the sliced pat or tab will drop freely and will not adhere or stick to the undersurface of the body of the blade. Another object of the invention is to provide a butter slicing and dispensing apparatus having a rotary magazine having tubes which receive and hold adequate supplies of butter to be sliced, the design being such that these tubes can be consecutively positioned over a tubular means leading to the cutting mechanism whereby the supply in each tube can be fed to the cutting mechanism conveniently.

A further object of the invention is to provide a butter slicing and dispensing device having a cutting mechanism and a rotary magazine which can be easily and quickly removed from the device for purposes of cleaning.

With the foregoing and other objects in view which will be made manifest in the following detailed description and specifically pointed out in the appended claims, reference is had to the accompanying drawings for an illustrative embodiment of the invention, wherein:

Figure 1 is a partial view in vertical section through one form of apparatus embodying the present invention;

Fig. 2 is a partial vertical section taken substantially upon the line 2—2 upon Fig. 1 in the direction indicated;

Fig. 3 is a bottom plan view of the cutting mechanism; and

Fig. 4 is a top plan view of the apparatus shown in Fig. 1, the cover of the apparatus being shown as having been removed.

Referring to the accompanying drawings wherein similar reference characters designate similar parts throughout, the improved butter slicing and dispensing machine comprises an outer wall 10, the bottom of which 11 provides the support for the device and has in its front a suitable opening 12 through which the sliced tabs or pats of butter can be withdrawn. A horizontal partition 13 extends across the device and above this partition there is preferably an inner wall 14 confining insulating material 15. Above the partition 13 there is a second partition 16 serving to support an inner cylinder 17, thus providing the spaces 18 and 19 designed to receive ice or other refrigerant to keep the butter cool. A standard 20 is secured to the bottom partition 13 at the center thereof and has adjacent its top a shoulder 21 which serves to support rotatably a suitable fitting or spider 22 which carries a rotary magazine 23. Tubes 24 are secured at their upper ends to the ring that forms the body of the magazine. These tubes as clearly shown in Fig. 4 are preferably square in cross section and are of such size as to receive the conventional quarter-pound brick of butter. In their side walls there are preferably crimps 25 which provide internal beads that come in contact with the sides of the brick of the butter forming minimum contact areas on which the bricks may slide downwardly through the tubes as they are fed to the butter slicing mechanism. At the bottom of each tube there is pivotally mounted a gate 26 urged into a position extending across the bottom of the tube by means of a spring 27. Each gate has a projecting arm 28 engageable with a cam or finger 29 located on the inside of the front of the device so that as the magazine is rotated that tube which is moved into a position opposite the cam or finger 29 will have the arm 28 of its gate contact the cam or finger and thus open the gate to permit egress or downward feeding of butter through its tube. On one of the tubes of the magazine there is a spring finger 30 carrying a rounded pin 31 receivable in any one of a number of apertures 32 in the top of the cylinder 17. The number of apertures 32 corresponds in number to the number of tubes 24 and this construction provides a yieldable lock or latching means for yieldably holding the magazine in any position wherein a tube 24 is opposite the cam or finger 29. A tube 33 which is also square in cross section connects partitions 16 and 13 below the location of the tube 24 opposite the cam or finger 29. This tube constitutes a tubular means through which the butter passes toward a cutting mechanism. The cutting mechanism comprises two opposed reciprocable cutting blades 34 and 35 and associated with these blades are a pair of opposed reciprocable supporting plates 36 and 37. Bars 38, 39, 40 and 41 are positioned between the cutting blades and the supporting plates. Bars 38 and 40 serve to connect supporting plate 37 with cutting blade 34. Similarly bars 39 and 41 serve to connect supporting plate 36 with cutting blade 35. The outer side edges of the cutting blades 34 and 35 extend beyond the bars 38 and 41 and into grooves in suspending rails 42 and 43 on the under-side of partition 13 so as to slidably support the cutting mechanism thereon. A lever is provided indicated at 44 which has pin and slot connections 45 and 46 with bars 41 and 38 respectively. This lever is fulcrumed on a thumb screw 47 mounted on a bracket 48 which is securely fastened to the underside of the partition 13. The outer end of the lever carries a handle 49 which extends forwardly through the opening 12 whereby on swinging the handle of the lever laterally it will turn about the thumb screw 47 as a center and bring about sliding action of the bars 38, 39, 40 and 41. As the cutting blades and supporting plates are cross connected by means of the bars, that is, each cutting blade is connected to the oppositely disposed supporting plate, the arrangement is such that movement of the lever brings about opposed movements of the cutting blades 34 and 35, thus as the cutting blades are brought together to effect a slicing of the butter B, they move toward each other at the same rate of speed and simultaneously the supporting plates 36 and 37 separate, thus although the bottom of the brick of butter initially rests on the supporting plates, when the lever is moved the cutting blades are brought together to effect a slicing and at the same time the supporting plates 36 and 37 separate to permit the cut off slice to drop. Reverse movement of the lever brings about a separation of the cutting blades and a return of the supporting plates to the position shown in Fig. 2 so that when one slice has been cut off and allowed to drop, the cutting blades may separate and allow the brick of butter B to drop onto the supporting plates 36 and 37.

It will be noted that the thickness of the slice or pat of butter is governed by the distance between the supporting plates and the cutting blades. This may be varied by putting in or taking out shims positioned between the top surfaces of the supporting plates 36 and 37 and the bars to which they are secured. A feature of the construction concerns the formation of the cutting edges of the cutting blades 34 and 35. As clearly shown in Fig. 2 these cutting edges are thickened as indicated at 50. The thickening may be accomplished by reversely bending the edge of the metal forming the body of the plate. When this is completed the edge is machined so as to be exactly 90° to the faces of the cutting blades or in other words, so as to be absolutely parallel to the direction of feed of the butter B. I find that if any attempt is made to bevel the edges of the blades the bevelling has a tendency to shift the brick of butter B. Consequently if the cutting edge is made perfectly parallel to the direction of feed of the butter, there is no tendency to shift the butter during the cutting action. The thickening of the blades is apparent on the underside thereof, thus forming a clearance where the butter is cut so that the cut off slab or pat of butter will not engage or stick to the underside of the body of each blade but on being cut will drop freely therefrom.

A feature of the invention concerns the ready removability of the cutting mechanism for purposes of cleaning. In one side wall of the outer wall or housing 10 there is provided a hinged door 51 of such size and shape that the cutting mechanism can be readily withdrawn therethrough. A spring 52 connects blade 35 with the interior of this door. This spring serves the double function of keeping the door normally closed and of keeping the cutting mechanism in the normal position shown in Fig. 2. When it is desired to remove the cutting mechanism for cleaning purposes however, the door may be forced open against the action of the spring 52 and the end of the spring attached to the cutting mechanism or to the door may be detached. The thumb screw 47 is then turned so as to release lever 44 which it fulcrums. When this is accomplished the entire cutting mechanism can be withdrawn through the door by sliding it out of rails 42 and 43. Replacement of the cutting mechanism is similarly accomplished. A cover for the device is provided indicated at 53 which has a rotatable handle 54 which has a clutching connection 55 with the top of spider 22. By turning this handle the rotary magazine may be rotated from one position to another to position a new tube 24 over the tubular means 33 when the previous tube has had its butter exhausted. At the forward side of the cover a rod 56 slidably extends therethrough carrying a weighted follower 57 which is positioned on top of the butter. This rod and its handle 58 serve not only to assist in feeding the butter toward the cutting mechanism but serve as an indicator as to the quantity of butter remaining in the tube 24 that is to be fed to the cutting mechanism. Obviously on turning the rotary magazine from one position to another the rod 56 must be lifted into its uppermost position and when a new tube 24 has been positioned the follower 57 is dropped onto the butter that is exposed therein. Ice water that may collect in the space 18 can be withdrawn from the device from time to time through a faucet 59.

From the above described construction it will be appreciated that the improved butter slicing and dispensing apparatus is of relatively simple and durable construction and that the parts thereof may be easily removed for cleaning purposes and then be replaced. Not only is the cutting mechanism readily removable as previously explained but the rotary magazine is likewise removable. This is accomplished by lifting off the cover which will expose the magazine which can then be lifted off of the standard 20. Inasmuch as the cutting mechanism employs two opposed reciprocable blades instead of a single blade or single cutting wire, there is no tendency for the cutting blades to force the butter B against a side of the tubular means 33. Danger of the butter thus sticking to the sides of the tubular means is completely avoided in that the opposed forces acting on the butter when the blades are brought together are effectively neutralized.

Various changes may be made in the details of the construction without departing from the spirit or scope of the invention as defined by the appended claims.

I claim:

1. In a butter slicer the combination of a pair of opposed supporting plates against which the butter is to be fed, a pair of opposed cutting blades spaces from the supporting plates a distance equal to the thickness of the pat of butter to be cut and means for moving the blades and plates toward and away from each other.

2. In a butter slicer the combination of a pair of opposed supporting plates against which the butter is to be fed, a pair of opposed cutting blades spaced from the supporting plates a distance equal to the thickness of the pat of butter to be cut and means connecting the blades and plates by which they may be moved whereby when the cutting blades are moved toward each other the supporting plates will be separated and when the plates are moved towards each other the blades will be separated.

3. In a butter slicer the combination of a pair of opposed supporting plates against which the butter is to be fed, a pair of opposed cutting blades spaced from the supporting plates a distance equal to the thickness of the pat of butter to be cut and means connecting each blade with its oppositely arranged plate and means for moving the blades toward and away from each other whereby when the blades are brought together the plates will be separated and when the plates are brought together the blades will be separated.

4. In a butter slicer, means toward which the butter is fed and a pair of opposed reciprocable blades for cutting the butter, each blade having a thickened cutting edge providing a clearance on the underside of the body of the blade.

5. In a butter slicer, means toward which the butter is fed and a pair of opposed reciprocable blades for cutting the butter, each blade having a thickened cutting edge providing a clearance on the underside of the body of the blade, the face of the cutting edge being parallel to the direction in which the butter is fed.

6. In a butter slicer, means toward which the butter is fed and a pair of opposed reciprocable blades for cutting the butter, each blade having a thickened cutting edge providing a clearance on the underside of the body of the blade, the face of the cutting edge being perpendicular to the direction of movement of the blade through the butter.

7. In a butter slicer, a slicing mechanism removably mounted in the butter slicer, a door through which the slicing mechanism can be withdrawn, and a spring connecting the slicing mechanism to the door serving to yieldably hold the slicing mechanism in normal position and to yieldably hold the door normally closed.

8. In a butter slicer, a pair of opposed sliding blades, means slidably supporting the blades, a pair of opposed supporting plates, bars connecting each blade with its oppositely arranged supporting plate, a lever operatively connected to the bars too cause the blades to move together and the plates to separate and vice versa and means providing a pivot for the lever.

9. In a butter slicer, a pair of opposed sliding blades, means slidably supporting the blades, a pair of opposed supporting plates, bars connecting each blade with its oppositely arranged supporting plate, a lever operatively connected to the bars to cause the blades to move together and the plates to separate and vice versa and means providing a pivot for the lever, said pivot being detachable to permit the lever, blades and plates to be removed as a unit from the slicer.

WALLACE M. MERRICK.